United States Patent [19]

Smith

[11] 4,384,085

[45] May 17, 1983

[54] PREPARATION OF NYLON-6 WITH REDUCED LEVELS OF WATER-EXTRACTABLE MATERIAL

[75] Inventor: Harry A. Smith, Midland, Mich.

[73] Assignee: The Dow Chemical Company, Midland, Mich.

[21] Appl. No.: 337,351

[22] Filed: Jan. 6, 1982

[51] Int. Cl.$^3$ .................... C08G 69/16; C08J 9/26; C08J 9/28
[52] U.S. Cl. .................... 526/62; 528/312; 528/313; 528/314; 528/320; 528/323
[58] Field of Search ............ 526/62; 528/323, 312, 528/313, 314, 320

[56] References Cited

U.S. PATENT DOCUMENTS

| | | | |
|---|---|---|---|
| 3,669,946 | 6/1972 | Koyanagi et al. | 526/62 |
| 4,007,320 | 2/1977 | Petersen | 526/62 |
| 4,068,059 | 1/1978 | Witenhafer | 526/62 |
| 4,090,015 | 5/1978 | Koyanagi et al. | 526/62 |

OTHER PUBLICATIONS

Modern Plastics Ency., vol. 57, No. 10A, pp. 3, 68, 70 and 550–552, Oct. 1980.

Primary Examiner—Harold D. Anderson

[57] ABSTRACT

Poly($\epsilon$-caprolactam) is prepared with less than 3 percent water-extractable material by carrying out the polymerization reaction in a vessel, the interior surfaces of which are coated with an inert adherent coating of an organic polymer.

11 Claims, No Drawings

4,384,085

PREPARATION OF NYLON-6 WITH REDUCED LEVELS OF WATER-EXTRACTABLE MATERIAL

BACKGROUND OF THE INVENTION

This invention relates to a novel process whereby nylon-6 and copolymers of ε-caprolactam having discreet polyamide segments are prepared having reduced levels of water-extractable materials.

Nylon-6 is an impact resistant, heat resistant thermoplastic resin useful in the production of films, molded and extruded articles and fibers for carpets, textiles and tire cords. Copolymers of ε-caprolactam have additional uses as surfactants, dispersants and as components in coating compositions.

Nylon-6 is commercially produced by polymerizing ε-caprolactam at temperatures from about 180° to 300° C. in the presence of water and acetic acid. The polymerization mixture thus formed reaches an equilibrium wherein it contains about 8 to 15 weight percent water-extractable material comprising monomeric caprolactam and oligomers of caprolactam. The presence of this extractable material in the polymer causes inferior properties, e.g., weakness and softness, in the fibers, films and other articles produced therefrom. Thus, to be suitably employed in its aforementioned uses, nylon-6 and copolymers of ε-caprolactam must contain less than about 3 weight percent extractable material. Accordingly, caprolactam monomers and oligomers must be removed by extraction, vaporization or like procedures.

Generally, the monomers and oligomers are extracted by leaching the crude nylon-6 with water or steam at 95° to 100° C. This process, however, requires a large capital investment for equipment and also consumes substantial quantities of water and energy. In another commercially used process, ε-caprolactam monomers are vaporized from the nylon under reduced pressure, but this process does not always adequately remove the less volatile oligomers.

Because the aforementioned processes for removing the extractable material substantially increase the production costs of polycaprolactam, a process wherein nylon-6 is prepared having low levels of water-extractable material would substantially reduce production costs and is therefore highly desirable.

SUMMARY OF THE INVENTION

The present invention is such a desirable method for polymerizing ε-caprolactam containing compositions to form nylon-6 and copolymers of ε-caprolactam having polyamide segments. According to this invention, nylon-6 and copolymers of ε-caprolactam having amide linkages are prepared with low levels of water extractables by melt polymerizing ε-caprolactam in a reaction vessel, the interior surfaces of which have been covered with an adherent organic polymeric coating, which remains essentially inert and inherent to said interior surfaces under the conditions of the ε-caprolactam polymerization reaction. The polymerization reaction is carried out according to a well-known melt process now being used commercially. By polymerizing ε-caprolactam in a vessel, the interior surfaces of which are coated with an inert, adherent, organic polymer according to this invention, nylon-6 and copolymers of ε-caprolactam are prepared containing less than 5, preferably less than 3, weight percent of water-extractable materials without leaching or extracting, thus reducing or eliminating the expense of removing the oligomers and monomers therefrom.

DETAILED DESCRIPTION OF THE INVENTION

Nylon-6 (poly(ε-caprolactam)) and copolymers of ε-caprolactam having discreet polyamide segments are prepared with low levels of water-extractable material according to this invention by the melt polymerization of an initially present polymerizable polyamide-forming ε-caprolactam composition. For the purposes of this invention, "initially present polymerizable polyamide-forming ε-caprolactam composition" means a composition which contains monomeric ε-caprolactam which may be polymerized to form nylon-6 or block or graft copolymers having discreet polyamide segments. Illustrative of such polymerizable polyamide-forming ε-caprolactam compositions are a mixture of ε-caprolactam, adipic acid and hexamethylene diamine and compositions which are polymerizable to form block or graft copolymers having discreet polyamide segments, such as a mixture of ε-caprolactam and a linear polyether having terminal amino groups. In addition, said polymerizable polyamide-forming ε-caprolactam compositions may further contain certain catalysts, initiators, cross-linking agents, inhibitors, fillers, dyes or other materials beneficially employed in the polymerization reaction.

The polymerization of ε-caprolactam by a melt polymerization process is well-known in the art and is described in U.S. Pat. No. 2,241,321. The improvement which is the subject of the present invention is applicable to the polymerization of ε-caprolactam-containing compositions by any melt polymerization process. By "melt polymerization" is meant a polymerization reaction of ε-caprolactam carried out at temperatures above the melting point of the resulting polymer. In general, ε-caprolactam is melt polymerized by heating a quantity of the caprolactam to about 150° to 300° C. in the presence of about 0.05 to 10 moles of water or other initiators such as the hexamethylenediamine salt of adipic acid per mole of caprolactam. The preferred polymerization temperature is in the range of 200° to 275° C. Ordinarily, about 0.005 to 1 mole percent, based on moles of ε-caprolactam, of acetic acid is added to the reaction mixture before polymerization to control the molecular weight of the polymer. The polymerization is generally carried out in a closed vessel under superatmospheric pressure under an inert atmosphere such as nitrogen, argon, helium, carbon dioxide and the like. After the major portion of the monomer has been converted to polymer, the reactor is opened and the water permitted to distill at atmospheric or subatmospheric pressure.

Organic polymeric coatings beneficially employed in the practice of this invention must be essentially stable under the reaction conditions described hereinbefore. Specifically, said polymers must remain adherent to the internal surfaces of the reaction vessel at the temperature at which the melt polymerization reaction is carried out. In addition, the organic polymeric coatings are chemically inert under the conditions of the melt polymerization. By "chemically inert" is meant that the polymer does not react with any of the reagents, the atmosphere or the polycaprolactam formed during the polymerization. Advantageously, the polymer contains no acidic hydrogen atoms which can react with the polyamide. Moreover, the polymers suitably employed in the practice of this invention are capable of being cast onto the interior surfaces of a reaction vessel and dried, cured or otherwise converted to a solid, adherent coating. Preferably, the coating polymer is capable of being dispersed to form an aqueous colloidal dispersion and sprayed or brushed onto the interior surfaces of the reactor. Exemplary organic polymers suitably employed in the practice of this invention include fluorocarbon polymers, poly(organosiloxane) resins, polyphenylene sulfide resins and certain polyimides and aromatic polyamide resins which are described hereinafter in greater detail.

Fluorocarbon polymers which retain their mechanical properties at the temperatures of the melt polymerization reaction are preferably employed as the coating material. Among fluorocarbon polymers, polytetrafluoroethylene (PTFE) is especially preferred. Other suitable fluorocarbon polymers include fluorinated ethylene/propylene copolymers and perfluoroalkoxy resins as represented by the general formula:

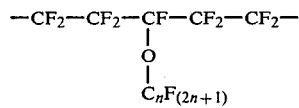

wherein n is an integer, preferably from 1 to 4. Additionally, the fluorocarbon polymers may beneficially contain one or more fillers such as glass, bronze, carbon or graphite. Fluorocarbon polymers are extruded or molded into the desired shape and affixed to the internal surfaces of the reaction vessel or can be dispersed to form an aqueous dispersion and sprayed or brushed onto the internal surfaces of the reaction vessel.

Also preferred are organopolysiloxane compounds, such as silicone fluids, silicone rubbers and silicone varnishes, which can be cured to form a coating which remains inert and adherent to the walls of the reaction vessel during the polymerization reaction. A broad range of silicone compounds may be used for the coating material in this invention and the exact molecular structure thereof is not particularly critical.

Illustrative silicone varnishes are those organopolysiloxanes having an average unit formula:

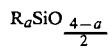

wherein R is an alkyl, alkenyl or aryl group or a halogen or cyano-substituted alkyl, alkenyl or aryl group and a is a positive number in the range from 1.0 to 1.8. Said varnishes are preferably curable at room temperature or at moderately elevated temperatures to form a solid, adherent, organopolysiloxane coating on the internal surfaces of the reaction vessel.

Silicone rubbers which cure by cross-linking at room temperature or at elevated temperatures in the presence of a catalyst are also suitably employed to coat the internal surfaces of the reaction vessel. Exemplary silicone rubbers include diorganopolysiloxanes having terminal hydroxyl groups, or mixtures thereof with an alkoxysilane. Catalysts such as organic peroxides, platinum compounds and water may be employed in order to cure the silicone rubber.

In addition to the above silicone compounds, silicone fluids such as dialkylpolysiloxanes, alkylarylpolysiloxanes, alkylhydrogenpolysiloxanes and the like, as well as any thereof having a small amount of functional groups, such as hydroxyl and alkoxy groups, attached to the silicone atoms and which also have chain terminating groups, may be suitably employed in the practice of this invention.

The silicone compounds are conveniently applied to the internal surfaces of the reaction vessel in the form of a water dispersion or as a solution in an organic solvent, and cured to a solid adherent coating. Alternatively, a mixture of one or more hydrolyzable polyfunctional organosilanes may be applied to the reaction vessel and subjected to hydrolysis-condensation in the presence of water to form a cured organosiloxane coating. Said hydrolyzable polyfunctional organosilanes include dihalogensilanes such as dimethyldichlorosilane, trihalogensilanes such as ethyltrichlorosilane, dialkoxysilanes such as methylphenyldiethoxysilanes, trialkyoxysilanes such as methyltrimethyloxysilane and the like.

Poly(phenylene sulfide) resins having the general structure:

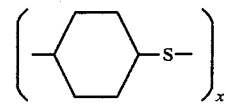

wherein x is a positive integer, preferably at least 70, can also be used to form the reaction vessel coating. Poly(phenylene sulfide) resins are generally employed in the form of a particulate solid and applied via a slurry coating, flocking or electrostatic coating. Glass or mineral-filled poly(phenylene sulfide) resins also form suitable coatings.

Other suitable polymers include fully polymerized, fully imidized thermoplastic aromatic polyimides, poly(amide-imides) formed by the condensation copolymerization of trimellitic anhydride and an aromatic diamine, and those aromatic polyamides which remain inert and adherent to the internal surfaces of the reaction vessel at the temperature of the melt polymerization reaction. Of these, polyimides are of particular interest because they (1) can be molded or cast as a film (2) are available as filled resins employing graphite, molybdenum, or tungsten disulfide as fillers, and (3) may be employed as an alloy with polytetrafluoroethylene or poly(phenylene sulfide) resins.

The polymer is beneficially applied to the internal surfaces of the reaction vessel by any conventional coating method which is adaptable to the particular polymer to be employed. Said coating methods include, but are not limited to, spraying, brushing, molding, electrodeposition or flooding the reactor with a solution of dispersion of the polymer and then draining the reactor. Certain suitable PTFE and silicone resins are commercially available as aerosols. Techniques for applying the resin are well-known and should not be construed as limiting the present invention.

After applying the polymer to the internal surfaces of the reaction vessel, it is cured, and dried, cross-linked or otherwise converted to a solid adherent coating. The manner of converting the polymer to a solid coating is not critical to this invention and will be generally dictated by the particular polymer employed as the coating material.

Similarly, the thickness of the coating is not critical as long as the internal surfaces of the reaction vessel which contact the reaction mixture are essentially completely covered. At least 95 percent, preferably at least 99 percent, most preferably at least 99.9 percent of said internal surfaces of the reaction vessel are covered with the polymeric coating. However, the thickness of the coating applied to the reaction vessel may vary somewhat according to the particular coating employed. For example, coatings such as poly(phenylene sulfide) which are particularly resistant to removal, may be beneficially employed in thickness of less than about 0.0025 mm. On the other hand, less resistant resins such as PTFE resins are suitable at thicknesses from about 0.0025 mm to about 12.5 mm. In general, however, the coating thickness is preferably in the range of about 0.0025 mm to about 0.25 mm.

Nylon-6 is polymerized from ε-caprolactam in a vessel coated in accordance with the invention using the presently employed commercial processes described hereinbefore. Nylon-6 produced in accordance with this invention has preferably less than 3 percent water-extractable material.

The following examples are provided to illustrate the practice of the present invention but are not intended to limit the scope of the invention in any way.

EXAMPLE 1

A four-liter stainless steel Parr reactor is coated on all internal surfaces which come in contact with the reaction mixture with a polyorganosiloxane polymer sold as IMS ® Silicone Spray Parting Agent (Spray No. 5512) using an aerosol spray to apply the coating. The polymer is allowed to dry to coating 0.5 mil in thickness. The reactor is charged with 339 grams of ε-caprolactam, 5.0 grams of water and 1.09 grams of acetic acid and sealed. The reactor is purged with nitrogen and the sealed reactor is heated to 250° C. for 12 hours. The reactor is then vented and purged with nitrogen for an additional 12 hours at 250° C. A yield of 303.7 grams of nylon-6 is obtained. The product is determined by gas chromatography to contain no residual caprolactam.

The water-extractable value of the polyamide thus formed is determined in the following manner: 2 grams of polymer are passed through a 20-mesh U.S. sieve size screen and extracted in boiling water for 90 minutes. The mixture is cooled and filtered. The filtrate is evaporated on a steam bath under a pressure of 10 millimeters of mercury absolute for 15 minutes after any visible liquid has disappeared. The container with the residue is then dried for 10 minutes at 110° C. in a circulating air oven. Container and residue are placed in a desiccator and allowed to cool to room temperature and are weighed. The weight percent of extractables is then calculated to be 2.5 weight percent.

Relative viscosity (RV) is determined by measuring the viscosity of a 96 percent sulfuric acid solution containing 1 gram of the polymer to 182.5 grams of sulfuric acid at 25° C. and the viscosity of the acid without polymer. The relative viscosity, which is the viscosity of the acid plus polymer divided by the viscosity of the acid without polymer, is determined to be 2.55. Number average molecular weight ($M_n$) is determined in accordance with the equation:

$$\log M_n = 0.301 \log(11{,}300\, RV\text{-}23{,}000) + 3.278$$

and determined to be 25,800.

EXAMPLE 2

The reaction of Example 1 is repeated employing a reactor coated with a polytetrafluoroethylene resin applied using an aerosol spray. A yield of 302.3 grams of nylon is obtained which is determined by gas chromatography to contain 0.04 percent residual caprolactam. Water-extractables are determined according to the method described hereinbefore and found to be 2.0 weight percent. Relative viscosity is 2.35 indicating a number average molecular weight of 22,200.

What is claimed:

1. A process for making linear moldable, film-forming or fiber-forming polyamide which process comprises melt polymerizing an initially present polymerizable ε-caprolactam-containing composition in a reaction vessel having its internal surfaces coated with an adherent coating of an organic polymer that remains chemically inert and adherent to said internal surfaces during the melt polymerization, whereby the resulting linear polyamide contains less than 5 weight percent of water-extractable materials.

2. A process as in claim 1 wherein the resulting polyamide contains less than 3 weight percent of water-extractable materials.

3. A process as in claim 1 wherein the organic polymer remains chemically inert and adherent to said internal surfaces at a temperature of at least 240° C.

4. A process as in claim 1 wherein the organic polymer remains chemically inert and adherent to said internal surfaces at a temperature of at least 275° C.

5. A process as in claim 1 wherein at least 95 percent of the interior surfaces of the reaction vessel are coated with the adherent coating.

6. A process as in claim 1 wherein the organic polymer is a fluorocarbon polymer.

7. A process as in claim 5 wherein the thickness of said coating is from about 0.0025 mm to about 12.5 mm.

8. A process as in claim 1 wherein the organic polymer is an organosiloxane resin.

9. A process as in claim 1 wherein the organic polymer is a poly(phenylene sulfide) resin.

10. A process as in claim 1 wherein the organic polymer is a fully polymerized, fully imidized thermoplastic aromatic polyimide.

11. A process as in claim 8, 9 or 10 wherein the thickness of said coating is from about 0.0025 mm to about 0.25 mm.

* * * * *